United States Patent
Witzenburg

[15] 3,669,458
[45] June 13, 1972

[54] WATER PUMP SEAL
[72] Inventor: Marion J. Witzenburg, Peoria, Ill.
[73] Assignee: Caterpillar Tractor Co., Peoria, Ill.
[22] Filed: Sept. 25, 1970
[21] Appl. No.: 75,625

[52] U.S. Cl.................................................277/38, 277/82
[51] Int. Cl.......................................................F16j 15/32
[58] Field of Search...................277/38, 39, 40, 65, 82, 85, 277/157, 164

[56] References Cited

UNITED STATES PATENTS

| | | | |
|---|---|---|---|
| 3,022,081 | 2/1962 | Kosatka | 277/82 |
| 2,195,877 | 4/1940 | Steedman | 277/65 |

FOREIGN PATENTS OR APPLICATIONS

| | | | |
|---|---|---|---|
| 226,082 | 7/1962 | Austria | 277/65 |

Primary Examiner—Robert I. Smith
Attorney—Fryer, Tjensvold, Feix, Phillips & Lempio

[57] ABSTRACT

A water pump seal including a lip-type sealing member restrained in a sealing position to a containing case and engaging the outer periphery of a cylindrical face seal member for the purpose of providing a pressure balance seal by eliminating the communication of water pressure to the rear face of the face seal member. The face seal member is held concentric with a shaft to be received by the seal and restrained from rotation by a spring secured to the face seal member at one end and to the case at its other end. Such manner of rotation restraint and the use of a lip-type sealing member further contribute to increased seal life.

6 Claims, 1 Drawing Figure

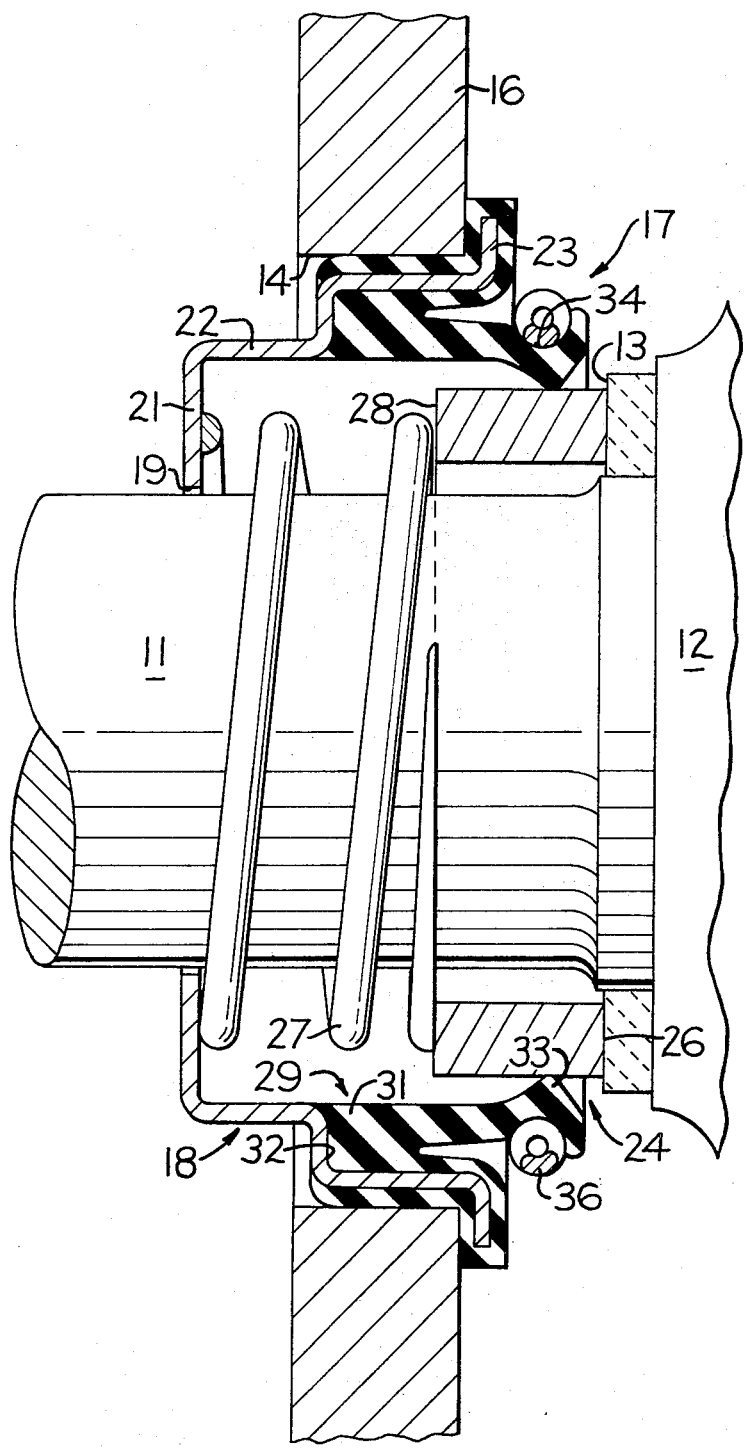
INVENTORS
MARION J. WITZENBURG

WATER PUMP SEAL

BACKGROUND OF THE INVENTION

Water pump shaft seals in use today generally employ a face seal member in conjunction with a bellows and spring to effect a seal between a rotating shaft and a housing. Such seals are usually provided in the form of a cartridge package-type assembly prefabricated at the factory in order that actual installation of the seal in mechanical equipment may be made with a minimum of effort and skill on the part of the operator. In this regard, an annular cup or case serves as a container for the face seal member, spring, and bellows, and is adapted for press fitting engagement in a recess of the housing, with the central opening through the case accommodating the rotary shaft. The face seal member is positioned at the forward end of the case, and the spring is disposed to act between a rear end wall of the case and the face seal member so as to resiliently urge the latter axially against a hub of the shaft when the assembly is installed to effect a rotary seal therewith.

The bellows is disposed coaxially outward of a central tubular portion of the case which inwardly defines the shaft accommodating opening thereof. One end of the bellows is fixedly secured, or staked to the face seal member, and the other end of the bellows is conventionally fixedly secured to the case. To prevent the face seal member from rotating with the shaft, the usual practice is to provide a plurality of lug members on the tubular hub portion of the case to slidably engage concave surfaces formed on the inner surface of the face seal member.

The conventional water pump seal design hereinbefore described presents a number of disadvantages making it difficult to achieve a long service life. Rotation of the water pump shaft applies a certain amount of torque to the face seal member forcing it to circumferentially engage the case hub lug members to prevent rotation. Over a period of time the face seal member wears the lugs and vice versa. The seal member may wear through the lugs in which case the seal member is prevented from fully engaging the sealing member of the pump shaft, thereby creating a leak. Alternatively, the concave locking surfaces of the face seal member may be rounded out, permitting the seal member to rotate and twist the bellows. The bellows will usually tear, thus causing another leak path.

Another disadvantage of the conventional pump seal arises from the use of a bellows which is usually designed to permit axial movement of the face seal member and forms a convolute when the seal is assembled. The sharp curves of the convolute cause cracks to occur at points where the bellows forms a sharp radius. These cracks have been found to occur even in new seals and propagate through thermocycling and flexing until failure of the bellows occurs.

The foregoing disadvantages have been greatly alleviated by the use of friction driving members in place of the hub lug members to prevent rotation of the face seal member and in the use of a lip-type seal, such as disclosed in copending application Ser. No. 13,425, assigned to the assignee of the present application, in place of a staked down bellows. However, a further disadvantage remains in that a pressure unbalance is created across the seal under various operating conditions. More particularly, the face seal member generally has a greater area exposed to water pressure on its back side than on its face side, thereby creating a slight pressure unbalance that increases face loading of the seal member. Under steady pressure conditions this may be compensated for in the design. However, system pressure variations aggravate the face loading condition leading to more rapid seal wear. When the seal face of the seal member wears flush with the shoulder thereof typically provided to restrain the bellows static sealing member, even less area of the face side is exposed to pressure resulting in less pressure acting on that side while pressure acting on the back side remains constant. Therefore, the force acting on the back side becomes relatively greater to further increase face load and seal wear and cause chattering of the seal.

SUMMARY OF THE INVENTION

The general object of the present invention is to provide a water pump seal of the cartridge or package type wherein communication of water pressure to the rear face of the dynamic face seal member is eliminated to provide a pressure balance seal having a relatively long operating life. A lip-type static sealing member and non-engaging securing means for restraining the dynamic face seal member against rotation are incorporated into the seal to further enhance the operating life thereof.

In the accomplishment of the foregoing and other objects and advantages, the seal of the present invention basically includes a lip-type static sealing member restrained in a sealing position to a containing case and engaging the outer periphery of a cylindrical tubular dynamic face seal member traversible by the shaft of a water pump and having a rim face sealably engageable with a hub portion of the shaft. The face seal member is held concentric with the shaft, resiliently loaded against the hub, and restrained from rotation by a compression spring fixedly secured to the face seal member at one end and fixedly secured to the case at its other end. The lip-type sealing member eliminates communication of water pressure to the rear face of the face seal member to thereby provide a pressure balanced seal of relatively simple design.

BRIEF DESCRIPTION OF THE DRAWING

The single FIGURE is a sectional view taken at a diametric plane through a seal in accordance with the present invention, the seal being depicted in operable position installed within a water pump housing and receiving the rotary shaft of the pump.

DETAILED DESCRIPTION OF THE INVENTION

Referring now to the drawing in detail, there is shown a water pump rotary shaft 11 having an enlarged hub 12 provided with an annular seal face 13. The shaft is capable of rotation in a bore 14 of a pump housing 16.

In order to provide a seal against the passage of water between the shaft 11 and housing wall containing the bore 14, a seal 17 in accordance with the present invention is installed in the bore and operably associated with the shaft. The seal is of the package type prefabricated at the factory in order that actual installation of the seal in a water pump may be made with a minimum of effort and skill on the part of the operator.

The seal 17 includes a generally cylindrical cupped case 18 having a coaxial circular opening 19 in the base end wall 21 thereof. The peripheral wall 22 of the case is outwardly flared at its end to define an annular flange 23 for support of the case against the housing wall when inserted into the bore 14. The shaft 11 coaxially traverses the opening 19, and a cylindrical tubular dynamic face seal member 24 having an end rim face 26 engaging the seal face 13 of shaft hub 12 is supported concentric with respect to the shaft by means of a helical compression spring 27 disposed between the opposite end face 28 of member 24 and the base end wall 21 of the case. Thus, the spring serves to resiliently load the seal member 24 against the face seal of the hub. The spring is preferably also employed to restrain the seal member against rotation with the shaft. In this latter regard, the opposite ends of the spring are preferably fixedly secured to the seal member end face 28 and to the case wall 21 by means of epoxy resin, or the like. In this manner rotation restraint is accomplished without requirement of interengaging portions of the seal member and case which tend to shorten seal life.

Disposed coaxially outward of the face seal member 24 and spring 27 there is provided a tubular generally cylindrical lip-type static sealing member 29. The sealing member 29 is formed at one end with an outwardly flared portion 31 which is molded to an intermediate outwardly stepped radial shoulder 32 of the case 18 and is preferably also molded over flange 23 and the upper end of the peripheral wall of the case. The outer surface of the molded portion 31 then engages the wall of bore 14 to sealably retain the case in position therein. The opposite end of the sealing member 29 is formed with an inwardly flared annular lip 33 engaging the outer peripheral wall of face seal member 24. The outer surface of sealing member 29 is provided with a circumferential groove 34 adjacent the lip 33 for receiving a garter spring 36 or the like which serves to urge the lip into slidable sealing engagement with the seal member 24.

With the seal 17 provided in the manner physically described hereinbefore, it is of importance to note that by virtue of the slidable sealing engagement of the lip 33 with the face seal member 24, the sealing member 29 is not subject to flexure which leads to failure from stress cracks. Of more importance, the sealing member 29 eliminates the communication of water pressure from the interior of the pump housing 16 to the rear face of the dynamic face seal member 24, thereby providing a pressure balanced seal having materially increased life. In addition, it will be appreciated that the pressure balanced seal is of relatively simple design compared to previous balanced seals which are relatively complex. Moreover, since the face seal member 24 is cylindrical in shape, it is longer lived, easy to produce and of low cost compared to conventional seals which typically have a shoulder machined or molded to them for the purpose of restraining the bellows and applying spring force.

Although the invention has been hereinbefore described and illustrated in the accompanying drawing with respect to a single preferred embodiment, it will be appreciated that numerous modifications and changes may be made therein without departing from the true spirit and scope of the invention, and thus it is not intended to limit the invention except by the terms of the appended claims.

What is claimed is:

1. A rotary seal comprising a substantially cylindrical cupped case having a coaxial circular opening in a base end wall thereof for traversal by a rotary shaft, said case being adapted for mounting within a bore of a housing, a cylindrical tubular dynamic face seal member disposed coaxially of said case for traversal by said shaft and having an end rim face for sealably engaging a seal face of a hub carried by said shaft, a compression spring coaxial with said shaft and acting between said base end wall of said case and a second opposite end rim face of said face seal member for coaxially resiliently urging said first end rim face into sealed engagement with said seal face of said hub, means fixedly securing the opposite ends of said spring respectively to said second end rim face of said face seal member and to said base end wall of said case, and a tubular substantially cylindrical lip-type static sealing member disposed coaxially outward of said face seal member having a first end sealably molded to the peripheral wall of said case and a second opposite end formed with an inwardly flared annular lip in slidable sealing engagement with the outer peripheral wall of said face seal member to thereby prevent pressure communication between the interior of said housing and the rear face of said face seal member.

2. A rotary seal according to claim 1, further defined by the second end of said static sealing member having a circumferential groove in the outer surface thereof adjacent said lip, and garter spring means received by said groove to urge said lip into slidable sealing engagement with said face seal member.

3. A rotary seal comprising a substantially cylindrical cupped case having a coaxial circular opening in a base end wall thereof for traversal by a rotary shaft and a peripheral wall extending axially of said base end wall, the peripheral wall of said case having an outwardly flared annular flange at its end and an intermediate outwardly stepped radial shoulder, said case being adapted for mounting within a bore of a housing, a cylindrical tubular dynamic face seal member disposed coaxially of said case for traversal by said shaft and having an end rim face for sealingly engaging a seal face of a hub carried by said shaft, a compression spring acting between said base end wall of said case and a second opposite end rim face of said face seal member for coaxially resiliently urging said first end rim face into sealed engagement with said seal face of said hub, means for restraining said face seal member against rotation coaxially thereof, and a tubular substantially cylindrical lip-type static sealing member disposed coaxially outward of said face seal member and having a first end including an outwardly flared portion molded to said shoulder and over said flange and the adjacent end of the outer peripheral wall of said case, and a second opposite end of said static sealing member formed with an inwardly flared annular lip in slidable sealing engagement with the outer peripheral wall of said face seal member to thereby prevent pressure communication between the interior of said housing and the rear face of said face seal member.

4. A rotary seal according to claim 3, further defined by the means for restraining said face seal member against rotation comprising means fixedly securing the opposite ends of said spring respectively to said second end rim face of said face seal member and to said base end wall of said case.

5. A rotary seal according to claim 4, further defined by the second end of said static sealing member having a circumferential groove in the outer surface thereof adjacent said lip, and garter spring means received by said groove to urge said lip into slidable sealing engagement with said face seal member.

6. A rotary seal comprising a substantially cylindrical cupped case having a coaxial circular opening in a base end wall thereof for traversal by a rotary shaft, said case being adapted for mounting within a bore of a housing by a peripheral wall extending from said base end wall thereof, the peripheral wall of said case having an outwardly flared annular flange at its end and an intermediate outwardly stepped radial shoulder, a cylindrical tubular dynamic face seal member disposed coaxially of said case for traversal by said shaft and having an end rim face for sealingly engaging a seal face of a hub carried by said shaft, a compression spring acting between said base end wall of said case and a second opposite end rim face of said face seal member for coaxially resiliently urging said first end rim face into sealed engagement with said seal face of said hub, means for restraining said face seal member against rotation coaxially thereof, and a tubular substantially cylindrical lip-type static sealing member disposed coaxially outward of said seal face member including a first end having an outwardly flared portion molded to said shoulder and over said flange and the adjacent end of the outer peripheral wall of said case, and a second opposite end on said static sealing member formed with an inwardly flared annular lip having a circumferential groove in the outer surface thereof adjacent said lip, and garter spring means received by said groove to urge said lip into slidable sealing engagement with the outer peripheral wall of said face seal member to thereby prevent pressure communication between the interior of said housing and the rear face of said face seal member.

* * * * *